(12) United States Patent  (10) Patent No.: US 9,387,885 B2
Huang et al.  (45) Date of Patent: Jul. 12, 2016

(54) CONNECTING DEVICE FOR CONNECTING A VEHICLE SUB-FRAME AND A VEHICLE BODY AND VEHICLE COMPRISING THE SAME

(71) Applicants: SHENZHEN BYD AUTO R&D COMPANY LIMITED, Shenzhen, Guangdong (CN); BYD COMPANY LIMITED, Shenzhen, Guangdong (CN)

(72) Inventors: Taishuo Huang, Shenzhen (CN); Yanning Wen, Shenzhen (CN); Xiaofei Li, Shenzhen (CN); Fan Xu, Shenzhen (CN)

(73) Assignees: SHENZHEN BYD AUTO R&D COMPANY LIMITED, Shenzhen (CN); BYD COMPANY LIMITED, Shenzhen (CN)

( * ) Notice: Subject to any disclaimer, the term of this patent is extended or adjusted under 35 U.S.C. 154(b) by 99 days.

(21) Appl. No.: 14/380,050

(22) PCT Filed: Feb. 26, 2013

(86) PCT No.: PCT/CN2013/071904
§ 371 (c)(1),
(2) Date: Aug. 20, 2014

(87) PCT Pub. No.: WO2013/127327
PCT Pub. Date: Sep. 6, 2013

(65) Prior Publication Data
US 2015/0042121 A1    Feb. 12, 2015

(30) Foreign Application Priority Data
Feb. 29, 2012    (CN) .......................... 2012 1 0048300

(51) Int. Cl.
*B62D 24/00* (2006.01)
*B62D 21/11* (2006.01)

(52) U.S. Cl.
CPC ................ *B62D 24/00* (2013.01); *B62D 21/11* (2013.01)

(58) Field of Classification Search
CPC ................................ B62D 24/00; B62D 24/04
USPC .................................................. 296/35.1, 35.3
See application file for complete search history.

(56) References Cited

U.S. PATENT DOCUMENTS 2,708,133 A * 5/1955 Sewelin ............... B60G 99/006
                                                          280/104
2,769,656 A * 11/1956 Lee ....................... B60G 99/004
                                                          296/35.1
5,634,663 A    6/1997 Krupp et al.

FOREIGN PATENT DOCUMENTS

CN    201009934 Y    1/2008
CN    102351010 A    2/2012
(Continued)

OTHER PUBLICATIONS

Shenzhen BYD Auto R&D Company Limited, International Search Report and Written Opinion, PCT/CN2013/071904, Jun. 6, 2013, 12 pgs.
(Continued)

*Primary Examiner* — Dennis H Pedder
(74) *Attorney, Agent, or Firm* — Morgan, Lewis & Bockius LLP

(57) ABSTRACT

A connecting device for connecting a vehicle sub-frame and a vehicle body and a vehicle comprising the connecting device are also provided. The connecting device comprises a first end adapted to be fastened onto the vehicle sub-frame, and a second end adapted to be fastened onto the vehicle body, and the second end has at least one first branch adapted to be fastened onto a side member of the vehicle body and at least one second branch adapted to be fastened onto a bottom floor of the vehicle body.

15 Claims, 8 Drawing Sheets

(56) References Cited

FOREIGN PATENT DOCUMENTS

| | | |
|---|---|---|
| EP | 1314632 A2 | 5/2003 |
| EP | 1591349 A1 | 11/2005 |
| EP | 2048063 A1 | 4/2009 |
| JP | 08-058633 A | 3/1996 |
| JP | H10310081 A | 11/1998 |
| JP | 2003002229 A | 1/2003 |
| KR | 100883251 BI | 2/2009 |
| WO | WO2006/040741 A1 | 4/2006 |

OTHER PUBLICATIONS

Shenzhen BYD Auto R&D Company Limited, Extended European Search Report, EP13754083.7, Oct. 30, 2015, 7 pgs.

* cited by examiner

CONNECTING DEVICE FOR CONNECTING A VEHICLE SUB-FRAME AND A VEHICLE BODY AND VEHICLE COMPRISING THE SAME

RELATED APPLICATION

This application is a United States National Stage Application filed under 35 U.S.C. §371 of PCT Patent Application Serial No. PCT/CN2013/071904 filed on Feb. 26, 2013, which claims priority to Chinese Patent Application No. 201210048300.8, titled "CONNECTING DEVICE FOR CONNECTING A VEHICLE SUB-FRAME AND A VEHICLE BODY AND VEHICLE COMPRISING THE SAME", filed on Feb. 29, 2012, which both are hereby incorporated by reference in their entireties.

TECHNICAL FIELD

The present disclosure relates to a connecting device for connecting a vehicle sub-frame and a vehicle body, and a vehicle comprising the same.

BACKGROUND

Conventionally, the sub-frame and the vehicle body of vehicles are connected via a flexible bush to improve the shockproof performance and the comfort level of the vehicles, such connection is so called "one-point connection." When collision occurs, the shock-absorbing structure at the front of the vehicle normally cannot absorb all the collision energy, so that the sub-frame may be moved into the driver compartment, thus causing harm to the drivers and passengers.

SUMMARY

The present disclosure seeks to solve at least one of the problems existing in the prior art to at least some extent. To this end, an object of the present disclosure is to provide a connecting device for connecting a vehicle sub-frame and a vehicle body of a vehicle.

Another object of the present disclosure is to provide a vehicle comprising the above mentioned connecting device for connecting a vehicle sub-frame and a vehicle body.

The connecting device for connecting a vehicle sub-frame and a vehicle body according to embodiments of the present disclosure comprises: a first end adapted to be fastened onto the vehicle sub-frame, and a second end adapted to be fastened onto the vehicle body, and having at least one first branch adapted to be fastened onto a side member of the vehicle body and at least one second branch adapted to be fastened onto a bottom floor of the vehicle body.

With the connecting device according to embodiments of the present disclosure, the first end is fastened onto the vehicle sub-frame and the second end is fastened onto the vehicle body via a plurality of connecting branches, in other words, a firm and rigid connection between the second end and the vehicle body is achieved via a plurality of points, so that the connection is also called as "multi-point connection", so that the connecting rigidity between the vehicle sub-frame and the vehicle body is increased, and the stress concentration occurring during the assembling process can be reduced or avoided, thus improving the security of the vehicle. In addition, the connecting device according to embodiments of the present disclosure may spread the collision force that effects on the vehicle sub-frame to the vehicle body along various directions, so that the force-spreading performance of the connecting device is improved, so that the vehicle sub-frame can avoid invading into the driver compartment due to vehicle collision, or at least the degree of invading may be reduced.

In some embodiments, the connecting device comprises upper and lower shells fastened onto each other.

In some embodiments, each of the upper and lower shells is formed by a metal sheet via a stamping process.

In some embodiments, each of the upper and lower shells has a U-shaped cross section, and a side wall of the upper shell is welded to a corresponding side wall of the lower shell so as to form a fixed connection therebetween.

In some embodiments, the upper shell comprises first and second upper ends, and the lower shell comprises first and second lower ends, the first upper end and the first lower end are fastened onto each other so as to form the first end, and the second upper end and the second lower end are fastened onto each other so as to form the second end.

In some embodiments, the second upper end comprises at least one first upper branch and at least one second upper branch, the second lower end comprises at least one first lower branch and at least one second lower branch, the first upper branch and the first lower branch are fastened onto each other so as to form a first branch, and the second upper branch and the second lower branch are fastened onto each other so as to form a second branch.

In some embodiments, the connecting device further comprises a reinforcing element disposed between the upper and lower shells.

In some embodiments, the reinforcing element is fixed onto the upper shell.

In some embodiments, the connecting device has a configuration substantially similar to a head of a fork.

In some embodiments, the connecting device has a configuration substantially similar to a head of a fork. In other words, the configuration of the second end is substantially similar to a head of a fork, while the fork head comprises three branches: one first branch and two second branches which are merged into the first end. The first branch is perpendicular to a first plane and the two second branches are perpendicular to a second plane different from the first plane. For example, the first plane intersects the second plane and the first branch is longer than the two second branches.

The vehicle according to embodiments of the present disclosure comprises: a vehicle body; a vehicle sub-frame; and a connecting device as described above, the first end of the connecting device is fastened onto the vehicle sub-frame and the second end of the connecting device is fastened onto the vehicle body.

In some embodiments, the first end of the connecting device is fastened onto the vehicle sub-frame via a first connecting assembly, and the second end of the connecting device is fastened onto the vehicle body via a second connecting assembly.

In some embodiments, the second connecting assembly comprises at least one first member fastened onto the side member of the vehicle body, and at least one second member fastened onto the bottom of the vehicle body.

Additional aspects and advantages of the embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of the disclosure will become apparent and more readily appreciated from the following descriptions made with reference the accompanying drawings, in which.

DETAILED DESCRIPTION

Figure 1:
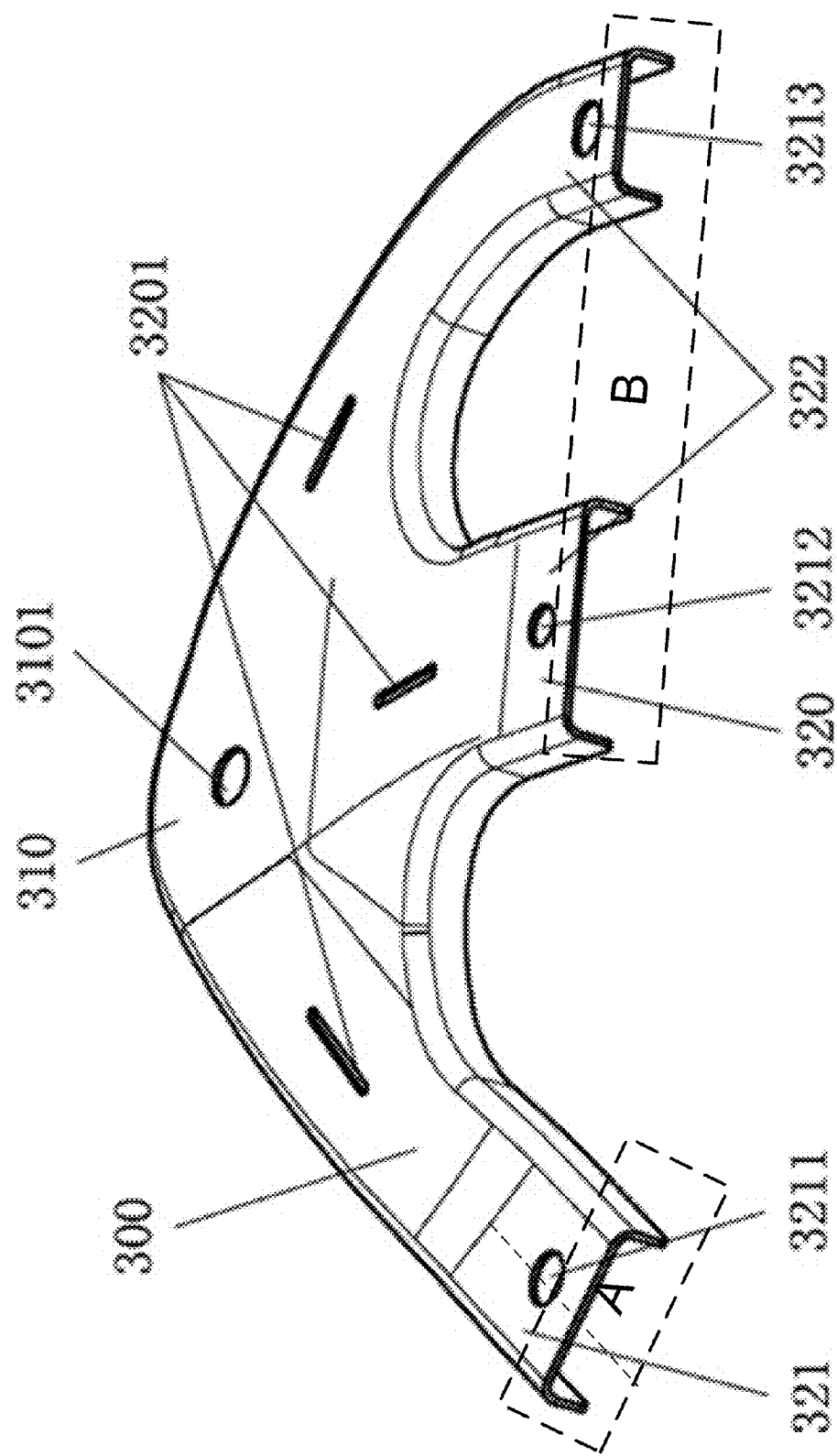
FIG. 1 is a schematic view of the upper shell of the connecting device according to an embodiment of the present disclosure.

Reference will be made in detail to embodiments of the present disclosure, samples of described embodiments are indicated in the drawings. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

In the description, Unless specified or limited otherwise, relative terms such as "central", "longitudinal", "lateral", "front", "rear", "right", "left", "inner", "outer", "lower", "upper", "horizontal", "vertical", "above", "below", "up", "top", "bottom" as well as derivative thereof (e.g., "horizontally", "downwardly", "upwardly", etc.) should be construed to refer to the orientation as then described or as shown in the drawings under discussion. These relative terms are for convenience of description and do not require that the present disclosure be constructed or operated in a particular orientation. In the present application, terms such as "first" and "second" are used herein for purposes of description and are not intended to indicate or imply relative importance or significance. Term "plurality" can be understood as two or more than two, unless expressly described otherwise.

Unless specified or limited otherwise, the terms "mounted," "connected," "coupled," and "secured" and variations thereof are used broadly, such as rigid attachments, also movable attachments, or integrated attachments; mechanical connections, also refer to a relationship wherein structures are secured or attached to one another either directly or indirectly through intervening structures, or structures having their interiors connected. As to those skilled in the art, specific meaning of the above mentioned terms in the present disclosure can be understood in accordance with specific conditions.

A connecting device for connecting a vehicle sub-frame and a vehicle body according to embodiments of the present disclosure will be described with reference to FIGS. 1-8.

As shown in FIGS. 1-6, in some embodiments, the connecting device for connecting a vehicle sub-frame and a vehicle body of a vehicle comprises a first end 100 adapted to be fastened onto the vehicle sub-frame 10, and a second end 200 adapted to be fastened onto the vehicle body 20. The second end 200 has at least one first branch 201 adapted to be fastened onto a side member 21 of the vehicle body 20 and at least one second branch 202 adapted to be fastened onto a bottom floor 22 of the vehicle body 20.

According to embodiments of the present disclosure, the first end is fastened onto the vehicle sub-frame and the second end is fastened onto the vehicle body via a plurality of connecting branches, in other words, a firm and rigid connection between the second end and the vehicle body is achieved via a plurality of points, so that the connection is also called as "multi-point connection", so that the connecting rigidity between the vehicle sub-frame and the vehicle body is increased, and the stress concentration occurring during the assembling process can be reduced or avoided, thus improving the security of the vehicle. In addition, the connecting device according to embodiments of the present disclosure may spread the collision force that effects on the vehicle sub-frame to the vehicle body along various directions, so that the force-spreading performance of the connecting device is improved, so that the vehicle sub-frame can avoid invading into the driver compartment due to vehicle collision, or at least the degree of invading may be reduced.

In some embodiments, the first end 100 is fastened onto the vehicle sub-frame 10, and the second end 200 is fastened onto the vehicle body 20.

In some embodiments, the first end 100 is rigidly coupled with the vehicle sub-frame 10, and the second end 200 is rigidly coupled with the vehicle body 20.

In some embodiments, the connecting device comprises an upper shell 300 and a lower shell 400 rigidly coupled with each other.

In some embodiments, each of the upper and lower shells 300, 400 is formed by a metal sheet via a stamping process.

In some embodiment, each of the upper and lower shells 300, 400 has a U-shaped cross section, and a side wall of the upper shell 300 is welded to a corresponding side wall of the lower shell 400. In this way, the connecting strength and the connecting rigidity of the connecting device are improved and the manufacture cost is reduced, thus further improving the performance of the connecting device.

In some specific embodiments, the upper shell 300 comprises a first upper end 310 and a second upper end 320, and the lower shell 400 comprises a first lower end 410 and second lower end 420. The first upper end 310 and the first lower end 410 are fastened onto each other so as to form a first end 100, and the second upper end 320 and the second lower ends 420 are fastened onto each other so as to form the second end 200.

In some embodiments, the second upper end 320 comprises at least one first upper branch 321 and at least one second upper branch 322. Planes "A" and "B", FIG. 1, are perpendicularly oriented to the branches 321 and 322, respectively. The second lower end 420 comprises at least one first lower branch 421 and at least one second lower branch 422. The first upper branch 321 and the first lower branch 421 are fastened onto each other so as to form a first branch 201, and the second upper branch 322 and the second lower branch 422 are fastened onto each other so as to form a second branch 202.

Figure 2:
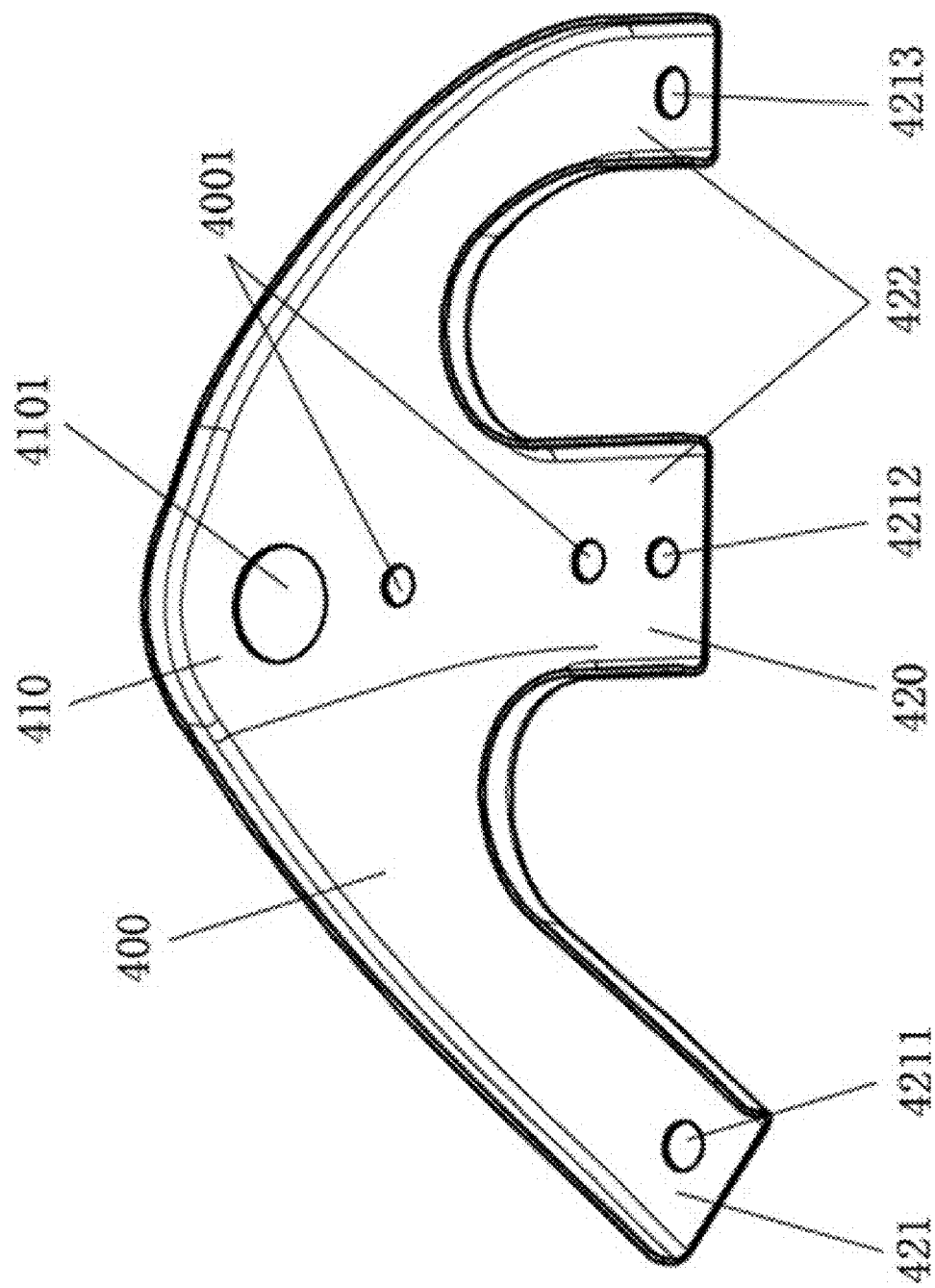
FIG. 2 is a schematic view of the lower shell the connecting device according to an embodiment of the present disclosure.

In embodiments shown in FIGS. 1-2, the second upper end 320 comprises one first upper branch 321 and two second upper branches 322, the second lower end 420 comprises one first lower branch 421 and two second lower branches 422. The first upper branch 321 and the first lower branch 421 are fastened onto each other so as to form the first branch 201, and the two second upper branches 322 and the two second lower branches 422 are fastened onto each other respectively so as to form the second branches 202.

In some embodiments, the second upper end 320 may further comprise an upper hole. Specifically, as shown in FIGS. 1-2, the first upper branch 321 comprises a first upper hole 3211, and one of the second upper branches 322 comprises a second upper hole 3212 while the other of the second upper branches 322 comprises a third upper hole 3213, the first upper end 310 may comprises a fourth upper hole 3101.

In some embodiments, the second upper end 320 of the upper shell 300 may also comprise a groove hole 3201. As shown in FIG. 1, the second upper end 320 of the upper shell 300 comprises three groove holes 3201. The groove hole 3201 may reduce the weight of the connecting device, so that the connecting device is more convenient for use and the manufacture cost may be reduced. Further, a reinforcing element 500 described in more details below may be welded with the upper shell 300 via the groove hole(s) 3201.

In some embodiments, the second lower end 420 may comprise a lower hole. Specifically, as shown in FIG. 2, the first lower branch 421 comprises a first lower hole 4211, one of the two second lower branches 422 comprises a second lower hole 4212, and the other of the two second lower branches 422 comprises a third lower hole 4213, and the first lower end 410 comprises a fourth lower hole 4101.

In some embodiments, the lower shell 400 may further comprise at least one through hole. Specifically, as shown in FIG. 2, the lower shell 400 comprises two round through holes 4001 formed between the first lower end 410 and the second lower branches 422. On the one hand, the through holes 4001 may reduce the total weight of the lower shell 400, on the other hand, a precise positioning between the reinforcing element 500 with the first and second shells 300, 400 may be ensured.

Figure 4:
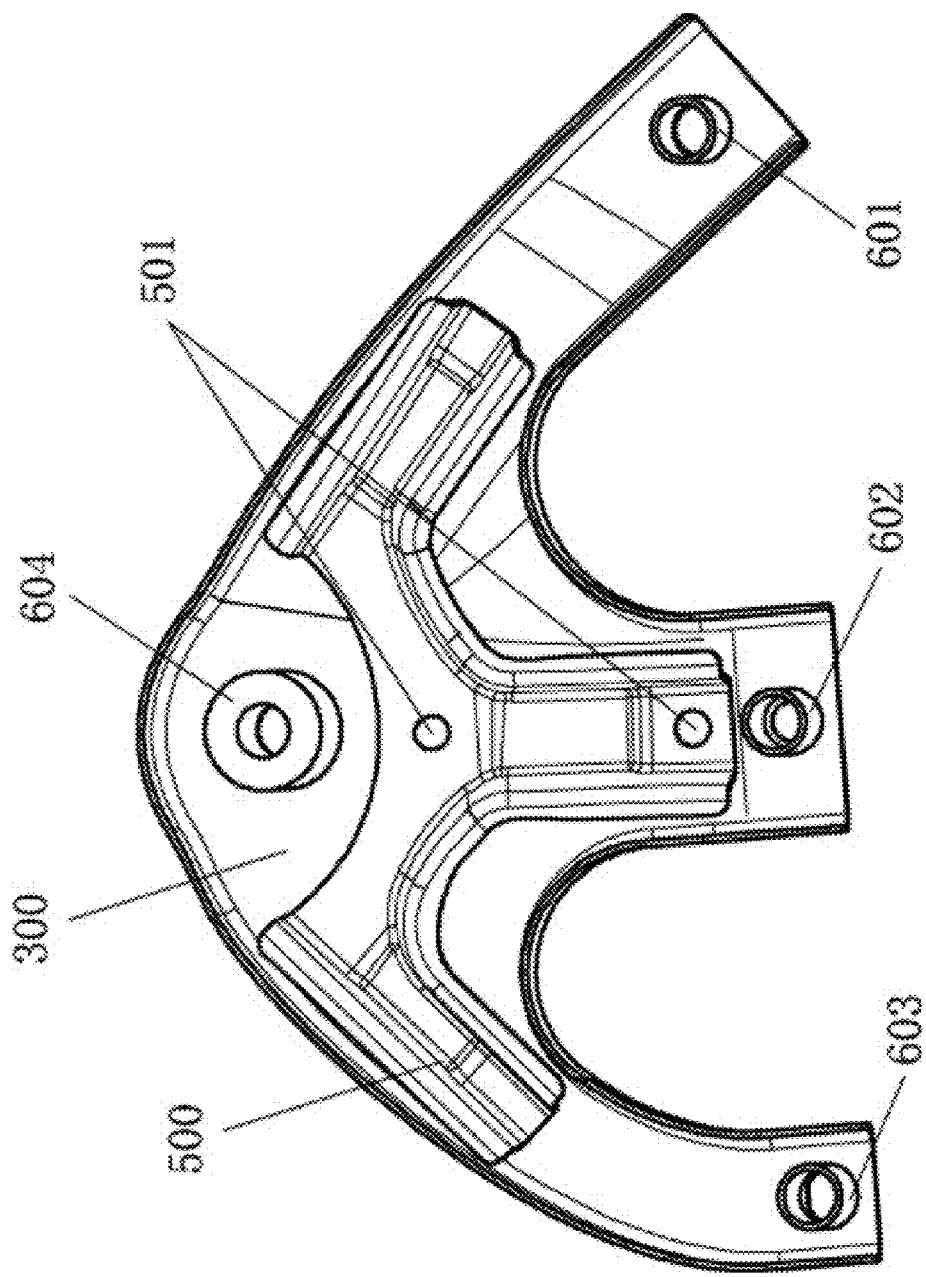
FIG. 4 is a schematic view of the upper shell assembled with the reinforcing element according to an embodiment of the present disclosure.

In some embodiments, the connecting device may further comprises a reinforcing element 500 disposed between the upper and lower shells 300, 400. As shown in FIG. 4, the reinforcing element 500 is fixedly disposed within the connecting device. In an embodiment, the reinforcing element 500 may be fixed onto the upper shell 300. In another embodiment, the reinforcing element 500 may be fixed onto the lower shell 400. In an alternative embodiment, the reinforcing element 500 may be fastened onto both the upper shell 300 and the lower shell 400.

In a further alternative embodiment, the reinforcing element 500 may be configured to be fastened onto the upper shell 300. The reinforcing element 500 may further comprise a limiting hole 501. The reinforcing element 500 is fixed onto the upper shell 300 through welding. During welding, the limiting hole 501 is aligned with the through hole 4001 in the lower shell 400, then the reinforcing element 500 is fixed and welded. With the reinforcing element 500, the strength of the connecting element is further improved.

The connecting device according to embodiments of the present disclosure has a configuration of similar to "fork". In other words, the connecting device may have a configuration substantially similar to a head of a fork. In some embodiments, the head of the fork may comprise at least two branches (i.e. fork arms).

In some embodiments, the "fork-shaped" connecting device has three branches, i.e. the head of the fork may comprise three fork arms. In some embodiments, the connecting device comprises two ends: the first end 100 adapted to be fastened onto the vehicle sub-frame 10, and the second end 200 adapted to be fastened onto the vehicle body 20. The second end 200 comprises one first branch 201 and two second branches 202 merged into the first end 100.

In some embodiments, the two second branches 202 define a perpendicular plane, and the one first branch 201 defines another perpendicular plane, thus providing the first end 100 with a curved shape. That the first branch 201 and the second branch 202 defining different perpendicular planes depends on the inner structure of the vehicle. The design of the embodiments of the present disclosure is aimed at coupling the shape of the connecting device with the shape of the vehicle sub-frame 10 and the vehicle body 20, thus facilitating transferring of forces to the vehicle body 20.

The vehicle according to embodiments of the present disclosure will be described hereinafter.

The vehicle comprises: a vehicle body 20; a vehicle sub-frame 10; and a connecting device as described above. The first end 100 of the connecting device is fastened onto the vehicle sub-frame 10 and the second end 200 of the connecting device is fastened onto the vehicle body 20.

In some embodiments, the first end 100 of the connecting device is fastened onto the vehicle sub-frame 10 via a first connecting assembly, and the second end 200 of the connecting device is fastened onto the vehicle body 20 via a second connecting assembly.

Figure 5:
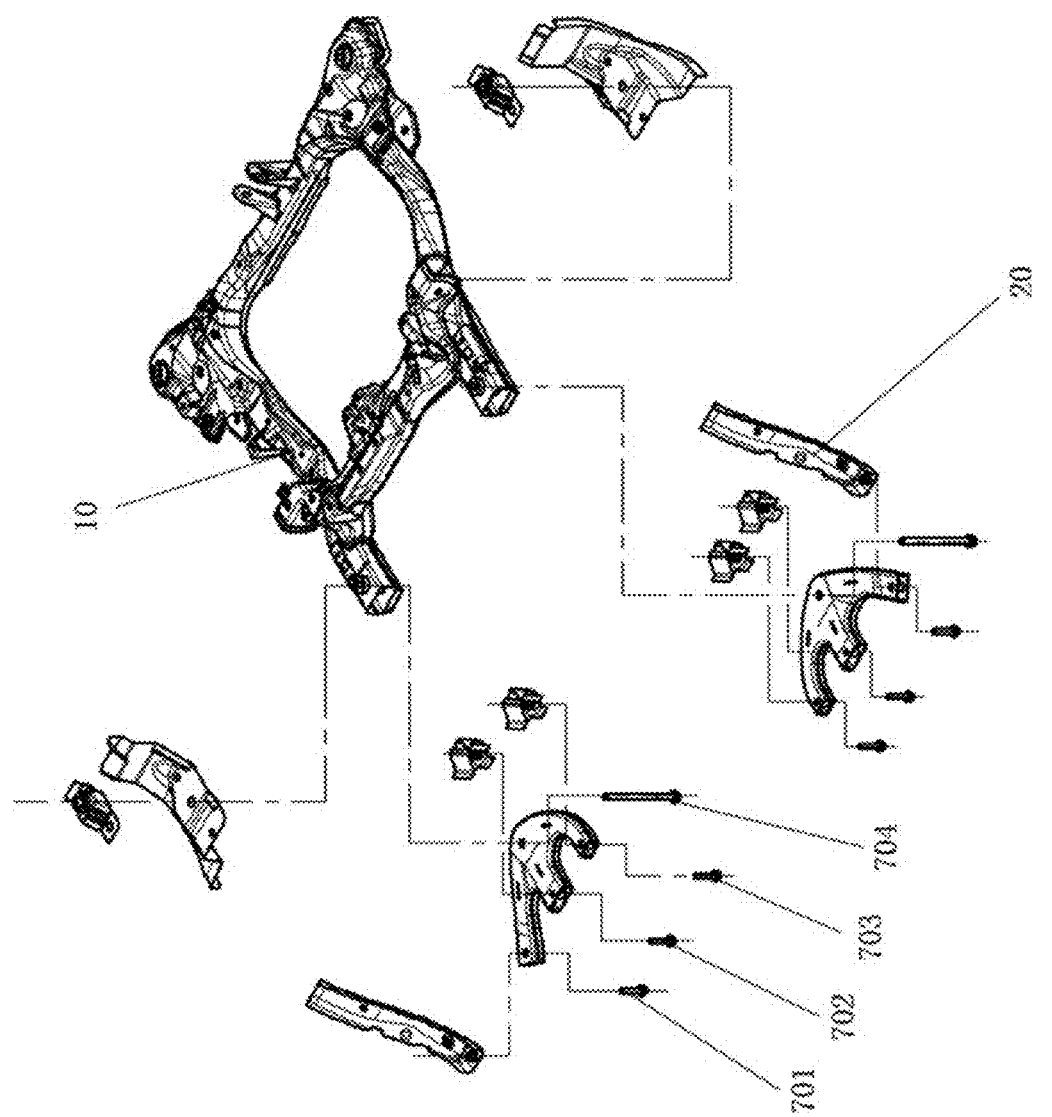
FIG. 5 is an exploded schematic view of the vehicle sub-frame, the connecting device, and the vehicle body according to an embodiment of the present disclosure.
Figure 6:
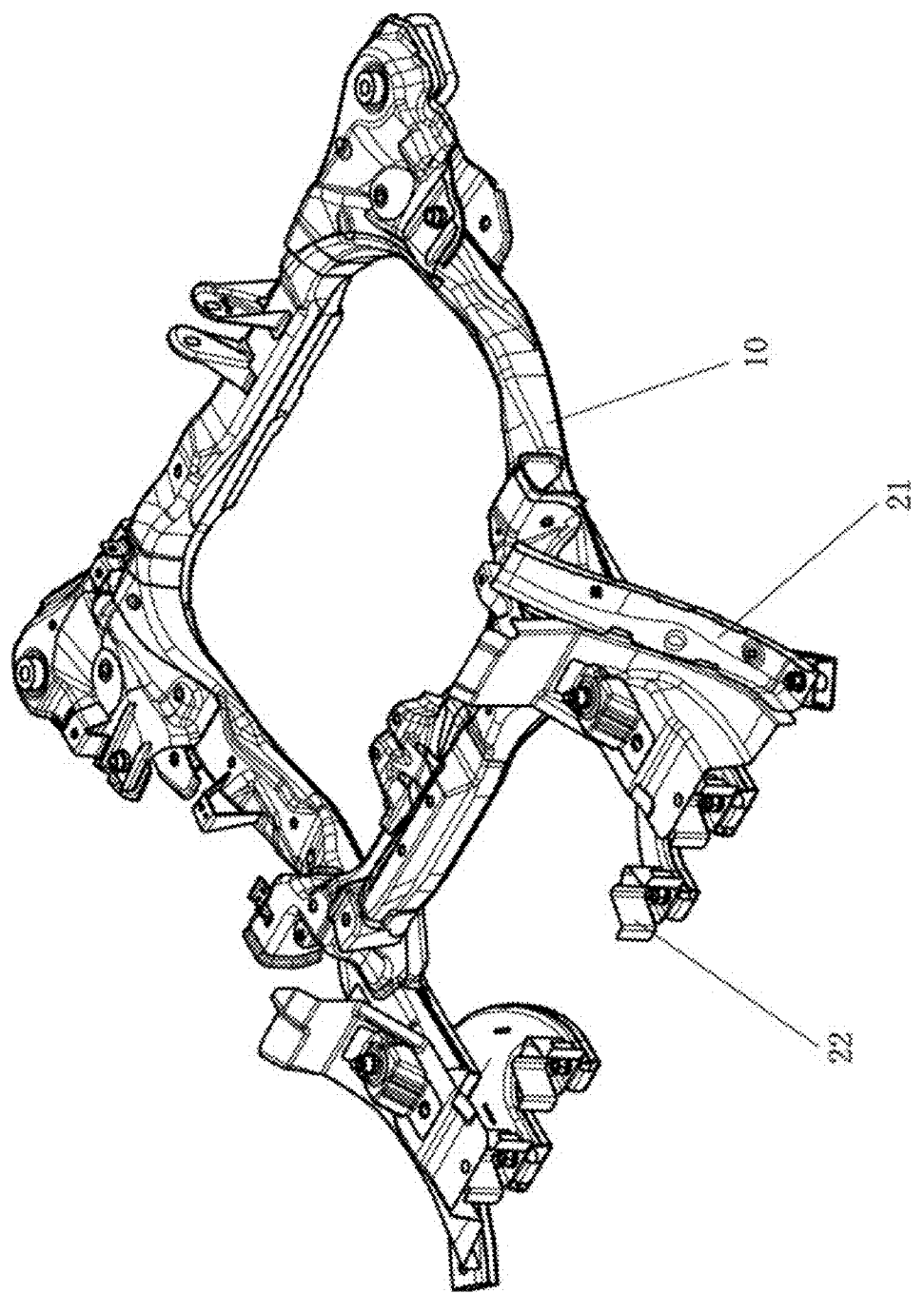
FIG. 6 is an exploded schematic view showing the connection between the vehicle sub-frame and the vehicle body according to an embodiment of the present disclosure.
Figure 7:
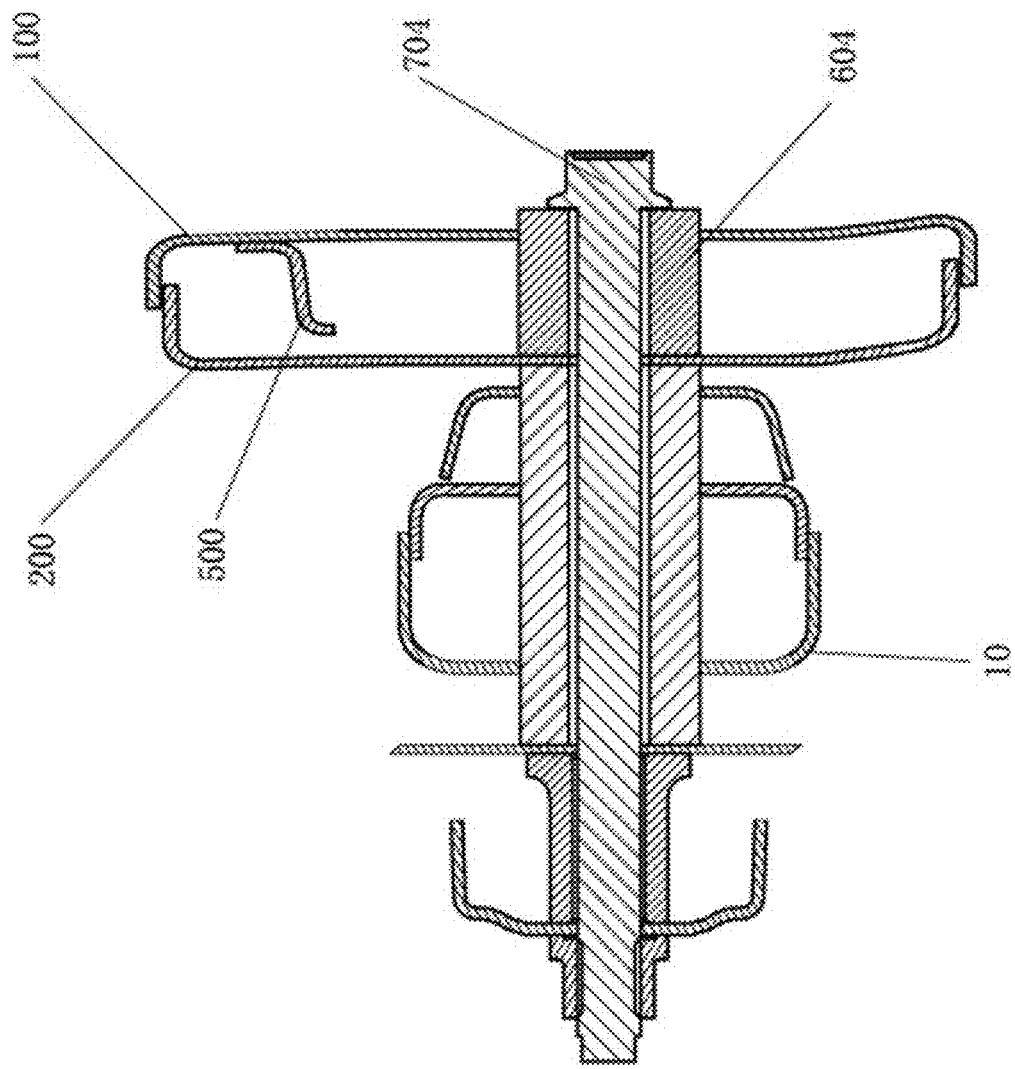
FIG. 7 is a cross-section view of a connection point between the vehicle sub-frame and the connecting device according to an embodiment of the present disclosure.
Figure 8:
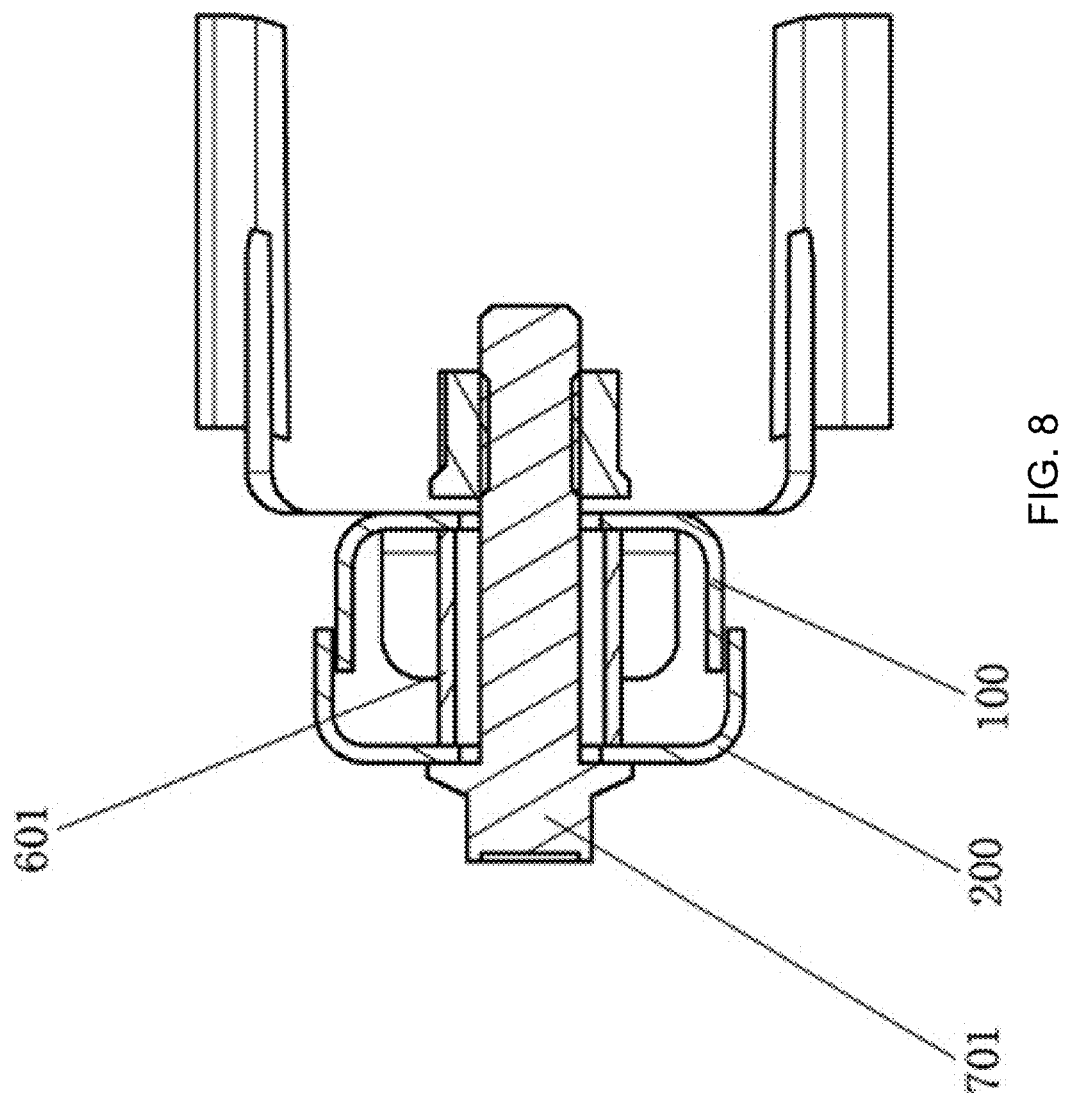
FIG. 8 is a cross-section view of a connection point between the connecting device and the vehicle body according to an embodiment of the present disclosure.

As shown in FIGS. 5-6, specifically, the first connecting assembly comprises a first hole formed by the fourth upper hole 3101 and the fourth lower hole 4101, a fourth upper sleeve 604 mounted onto and coaxially with fourth upper hole 3101, a fourth bolt 704, and a first mounting hole formed in a connecting end of the vehicle sub-frame and corresponded to the first connecting assembly. Specifically, the fourth bolt 704 passes through the first hole formed by the fourth upper hole 3101 and the fourth lower hole 4101, the fourth upper sleeve 604 and the first mounting hole, then fixed by a locking element, such as a nut, so as to fix the first connecting assembly and the vehicle sub-frame 10.

In some embodiments, the second connecting assembly comprises: a second hole formed in each of the first and second branches of the connecting device, a second sleeve fixed on each of the first and second branches and coaxial with the second hole, a second mounting hole formed in the vehicle body, and a second bolt passing through the second hole, the second sleeve and the second mounting hole so as to fix the vehicle body with the connecting device.

In other words, the second connecting assembly comprises at least one first member fastened onto the side member 21 of the vehicle body 20, and at least one second member fastened onto the bottom floor 22 of the vehicle body 20.

In some embodiments, the second connecting assembly comprises one first member fastened onto the side member 21 of the vehicle body 20, and two second members fastened onto the bottom floor 22 of the vehicle body 20.

As shown in FIGS. 5-6, the first member comprises a second hole formed by the first upper hole 3211 and the first lower hole 4211, a first upper sleeve 601 mounted onto and coaxially with the first upper hole 3211, a first bolt 701, and a second side mounting hole (not shown) formed in a connecting end of the vehicle body and corresponded with the first member. The first bolt 701 passes through the first upper hole 3211, the first lower hole 4211, the first upper sleeve 601 and the second side mounting hole, then fixed by a locking element such as a nut, so as to fix the first member and the vehicle body 20.

Figure 3:
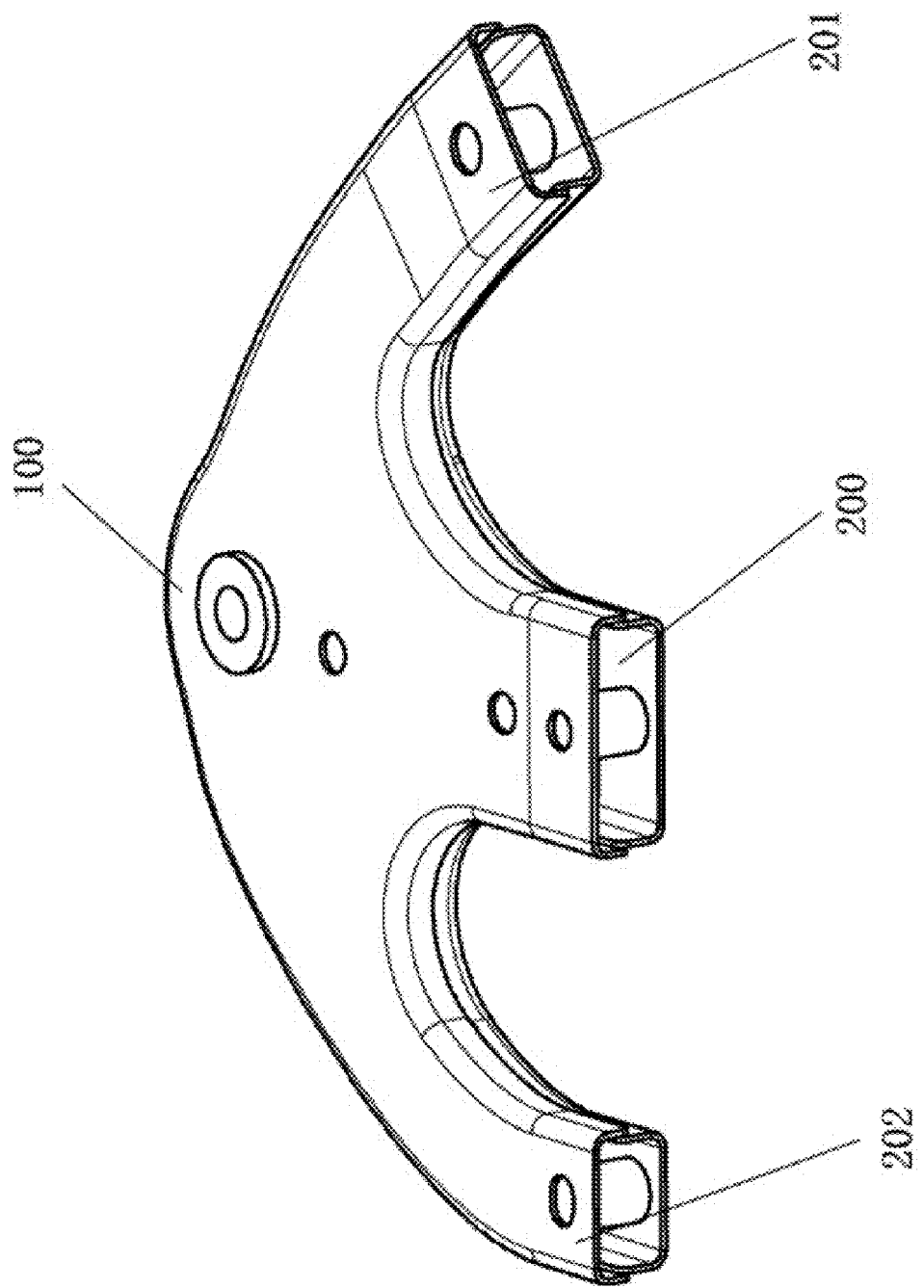
FIG. 3 is a schematic view of the connecting device according to an embodiment of the present disclosure.

As shown in FIGS. 5-6 and with reference to FIGS. 1-3, one of the two second member comprises a second hole formed by the second upper hole 3212 and the second lower hole 4212, a second sleeve 602 mounted onto and coaxially with the second upper hole 3212, a second bolt 702, and a second bottom mounting hole (not shown) formed in a connecting end of the vehicle body and corresponded with the second member. The second bolt 702 passes through the second upper hole 3212, the second lower hole 4212, the second upper sleeve 602 and the second bottom mounting hole, then fixed by a locking element such as a nut, so as to fix the present second member and the vehicle body 20.

As shown in FIGS. 5-6 and with reference to FIGS. 1-3, the other of the two second member comprises a second hole formed by the third upper hole 3213 and the third lower hole 4213, a third sleeve 603 formed onto and coaxially with the third upper hole 3213, a third bolt 703, and a second bottom additional mounting hole formed in a connecting end of the vehicle body and corresponded with the present second member. The third bolt 703 passes through the third upper hole 3213, the third lower hole 4213, the third upper sleeve 603 and the second bottom additional mounting hole, then fixed by a locking element such as a nut, so as to fix the present second member and the vehicle body 20.

In some embodiments, the third upper hole 3213 is an elongated hole, so that the assembly error occurring during the assembling process may be eliminated.

In some embodiments, each of the first to fourth sleeves 601, 602, 603, 604 may be formed by steel. Further, each of the first to third sleeves 601, 602, 603 may be a cylindrical steel sleeve, and has an inner diameter of about 18 mm, an outer diameter of about 22 mm, and a height of about 26 mm. The first to sleeves 601, 602, 603 are coupled with the first to third upper holes 3211, 3212, and 3213 respectively.

In some embodiments, the fourth sleeve 604 may be a cylindrical steel sleeve, and has an inner diameter of about 18 mm, an outer diameter of about 40 mm, and a height of about 32.5 mm. The fourth sleeve 604 may be mounted within the fourth upper hole 3101 via interference fit, and used for positioning the upper and lower shells during assembling them.

In some embodiment, the first to fourth sleeves 601, 602, 603, 604 may be welded on the upper shell 300.

In some embodiments, the connecting end of the vehicle sub-frame 10 comprises a first mounting hole for coupling with the first connecting assembly, the fourth bolt 704 passed through the fourth upper hole 3101, the fourth sleeve 604, the fourth lower hole 4101 and the first mounting hole so as to couple the first connecting end with the vehicle sub-frame 10. The vehicle body 20 comprises corresponding holes for coupling with the second connecting assembly. In a way similar, the second connecting assembly is fastened onto the vehicle body 20 via the first bolt 701, the second bolt 702, and the third bolt 703.

By way of example and without limitation, the connecting device according to embodiments of the present disclosure may be used to couple the front vehicle sub-frame 10 with the front vehicle body 20. Those having ordinary skill in the art will appreciate that the connecting device may be used to couple the rear vehicle sub-frame 10 with the rear vehicle body 20.

With the vehicle of embodiments of the present disclosure, the first end is fastened onto the vehicle sub-frame and the second end is fastened onto the vehicle body via a plurality of connecting branches, in other words, a firm and rigid connection between the second end and the vehicle body is achieved via a plurality of points, so that the connection is also called as "multi-point connection", so that the connecting rigidity between the vehicle sub-frame and the vehicle body is increased, and the stress concentration occurring during the assembling process can be reduced or avoided, thus improving the security of the vehicle. In addition, the connecting device according to embodiments of the present disclosure may spread the collision force that effects on the vehicle sub-frame to the vehicle body along various directions, so that the performance of the connecting device is improved, so that the vehicle sub-frame can avoid invading into the driver compartment due to vehicle collision, or at least the degree of invading may be reduced.

Reference throughout this specification to "an embodiment," "some embodiments," "one embodiment", "another example," "an example," "a specific examples," or "some examples," means that a particular feature, structure, material, or characteristic described in connection with the embodiment or example is included in at least one embodiment or example of the disclosure. Thus, the appearances of the phrases such as "in some embodiments," "in one embodiment", "in an embodiment", "in another example, "in an example," "in a specific examples," or "in some examples," in various places throughout this specification are not necessarily referring to the same embodiment or example of the disclosure. Furthermore, the particular features, structures, materials, or characteristics may be combined in any suitable manner in one or more embodiments or examples.

Although explanatory embodiments have been shown and described, it would be appreciated by those skilled in the art that changes, alternatives, and modifications can be made in the embodiments without departing from spirit and principles of the disclosure. Such changes, alternatives, and modifications all fall into the scope of the claims and their equivalents.

What is claimed is:

1. A connecting device for connecting a vehicle sub-frame and a vehicle body, comprising:
   a first end adapted to be fastened onto the vehicle sub-frame, and
   a second end adapted to be fastened onto the vehicle body, and having at least one first branch adapted to be fastened onto a side member of the vehicle body and at least one second branch adapted to be fastened onto a bottom floor of the vehicle body,
   wherein the connecting device comprises upper and lower shells fastened onto each other.

2. The connecting device according to claim 1, wherein the upper shell comprises first and second upper ends, and the lower shell comprises first and second lower ends,
   wherein the first upper end and the first lower end are fastened onto each other so as to form the first end, and the second upper end and the lower ends are fastened onto each other so as to form the second end.

3. The connecting device according to claim 2, wherein the second upper end comprises at least one first upper branch and at least one second upper branch,
   wherein the second lower end comprises at least one first lower branch and at least one second lower branch,
   wherein the first upper branch and the first lower branch are fastened onto each other so as to form the first branch, and
   wherein the second upper branch and the second lower branch are fastened onto each other so as to form the second branch.

4. The connecting device according to claim 1, wherein each of the upper and lower shells is formed by a metal sheet via a stamping process.

5. The connecting device according to claim 1, wherein each of the upper and lower shells has a U-shaped cross section, and a side wall of the upper shell is welded to a corresponding side wall of the lower shell.

6. The connecting device according to claim 1, further comprising a reinforcing element disposed between the upper and lower shells.

7. The connecting device according to claim 6, wherein the reinforcing element is fixed onto the upper shell.

8. The connecting device according to claim 1, wherein the connecting device has a configuration substantially similar to a head of a fork.

9. The connecting device according to claim 8, wherein the second end has two second branches and one first branch which are merged into the first end.

10. The connecting device according to claim 9, wherein the first branch is perpendicular to a first plane and the two second branches are perpendicular to a second plane different from the first plane.

11. The connecting device according to claim 10, wherein the first plane intersects the second plane.

12. The connecting device according to claim 9, wherein the first branch is longer than the two second branches.

13. A vehicle comprising:
   a vehicle body;
   a vehicle sub-frame; and
   a connecting device including:
      a first end fastened onto the vehicle sub-frame, and
      a second end fastened onto the vehicle body, and having at least one first branch fastened onto a side member of the vehicle body and at least one second branch fastened onto a bottom floor of the vehicle body,
   wherein the connecting device comprises upper and lower shells fastened onto each other.

14. The vehicle according claim 13, wherein the first end of the connecting device is fastened onto the vehicle sub-frame via a first connecting assembly, and the second end of the connecting device is fastened onto the vehicle body via a second connecting assembly.

15. The vehicle according claim 14, wherein the first connecting assembly comprises:
   a first hole formed in the first end of the connecting device;
   a first sleeve fixed on the first end of the connecting device and coaxial with the first hole;
   a first mounting hole formed in the vehicle sub-frame; and
   a first bolt passing through the first hole, the first sleeve and the first mounting hole so as to fix the vehicle sub-frame with the connecting device,
wherein the second connecting assembly comprises:
   a second hole formed in each of the first and second branches of the connecting device;
   a second sleeve fixed on each of the first and second branches and coaxial with the second hole;
   a second mounting hole formed in the vehicle body; and
   a second bolt passing through the second hole, the second sleeve and the second mounting hole so as to fix the vehicle body with the connecting device.

* * * * *